Jan. 24, 1928.
A. J. CHESSON
1,657,197
FERTILIZER DISTRIBUTOR
Filed March 11, 1925
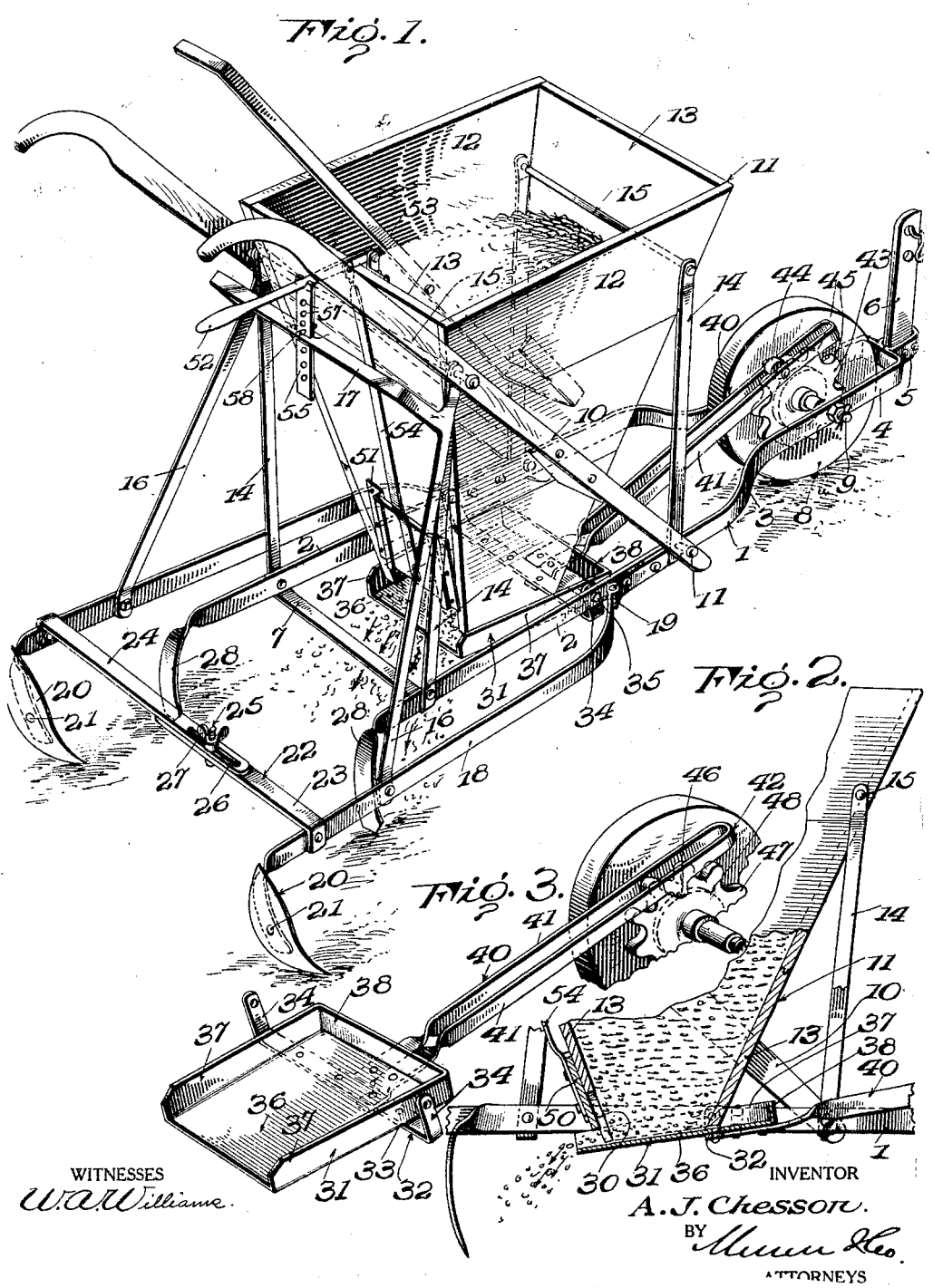
WITNESSES
W. A. Williams.
INVENTOR
A. J. Chesson.
BY
Munn &Co.
ATTORNEYS Patented Jan. 24, 1928.

1,657,197

UNITED STATES PATENT OFFICE.

ANDREW J. CHESSON, OF KINSTON, NORTH CAROLINA.

FERTILIZER DISTRIBUTOR.

Application filed March 11, 1925. Serial No. 14,808.

This invention relates to an improved fertilizer distributor, and has for its object to provide a machine of this character which is effective to properly distribute the desired quantity of fertilizer over the ground and to cover the fertilizer with soil, the machine being so constructed and organized and operating in such a novel and efficient manner as to accomplish these purposes even through the fertilizer be wet and heavy and other conditions be adverse to proper distribution.

A further object resides in the provision of a fertilizer distributor having these advantages and capacities and which is of simple though strong and durable construction, reliable and effective in operation, and easy and comparatively inexpensive to manufacture and operate.

Other objects and advantages reside in certain novel features of the construction, arrangement and combination of parts which will be hereinafter more fully described and particularly pointed out in the appended claim, reference being had to the accompanying drawing forming a part of this specification, and in which:

Figure 1 is a perspective view showing one embodiment of the invention,

Figure 2 is a fragmentary view in vertical section showing the lower end of the hopper and associated parts, and Figure 3 is a fragmentary perspective view showing the rocking tray associated with a somewhat different type of operating means.

Referring to the drawing the numeral 1 designates generally a substantially U-shaped frame which is made from a single piece of heavy strap iron bent to form a pair of side bars 2, the forward ends of which are bent inwardly, as at 3, and then extended forwardly, as at 4, to the front of the frame where the parallel extensions 4 are connected, by a loop 5, associated with a draft hitch 6. A transverse brace rod 7 extends between and is secured to the side bars 2 adjacent their rear ends.

The frame 1 is mounted on a ground wheel 8 which is fixed to an axle 9 rotatably mounted in suitable bearings provided therefor in the forward extensions 4 of the frame.

For the purpose of guiding the machine when in use, a pair of handles 10 are provided and have their lower ends secured, as at 11, to the side bars 2.

A hopper, designated generally at 11, is provided and includes side walls 12 and end walls 13 suitably secured to each other. The hopper 11 is supported on the frame 1 by means of standards 14, the lower ends of which are fastened to the side bars of the frame and the upper ends of which are fastened to cross rods 15 extending through suitable openings provided therefor in the side walls 12 of the hopper and disposed close against the end walls 13 thereof. The rearwardly disposed cross rod 15 also extends through suitable openings provided therefor in the handles 10 and in the upper ends of braces 16 so as to completely interlock these parts in the assembly. Of course, it is to be understood that suitable fastening devices, such as nuts, washers, and the like, are employed for holding the cross rods 15 to the parts with which they are associated. The braces 16 are connected adjacent their upper ends by a cross member 17.

At their lower ends the braces 16 are connected to plow beams 18, the latter being hinged at their forward ends to the side bars 2, as indicated at 19. The plow beams 18 have their rear ends twisted and downturned and to these downturned rear ends double-pointed plows or earth-working elements, designated at 20, are secured by bolts and nuts 21. A single bolt and nut may be employed for securing each element 20 to the downturned end of its plow beam due to the transverse curvature of the element 20. The beams 19 may be swung about their hinges 20 to a certain extent and this movement is accommodated by the resiliency of the braces 16 which are transversely yieldable to such an extent as to permit this movement although longitudinally rigid to such an extent as to exert the desired bracing action. The beams 18 are held in any adjustment by means of a brace member, designated generally at 22, the brace member 22 including sections 23 and 24 fastened to the plow beams 18 and overlapping each other to a certain extent. A bolt 25 is carried by the section 23 and extends through a slot 26 in the section 24. A wing nut 27 is threaded on the bolt 25 and co-acts with the bolt to clamp the sections 23 in any adjustment.

The side bars 2 have plow shovels 28 integrally formed at their rear ends, the plow shovels 28 being formed by twisting and bending downwardly and suitably shaping the metal making up the side bars.

As shown to advantage in Figure 2 the lower end of the hopper 11 is open and the rearwardly disposed side wall 13 of the hopper is provided with a discharge opening 30 adjacent the lower open end of the hopper. Immediately below the lower open end of the hopper 11 and immediately below the discharge opening 30 a tray 31 is disposed and this tray agitates the fertilizer material in the hopper and effects a discharge thereof through the opening 30. In order that the tray 31 may carry out these purposes it is carried by a cradle or swing 32 which is of substantially U-shaped form and has an elongated body portion 33 riveted to the tray and legs 34 pivotally mounted, as at 35, on the side bars 2 of the frame 1.

As shown to advantage in Figure 3 the tray 31 has a flat bottom plate 36, vertical side walls 37 and one end wall 38, the end wall 38 connecting the side walls 37 at the forward end of the tray. The rear end of the tray and its top are open and the tray tapers toward its rear end.

An operating element 40 is provided for the tray 31 and comprises a pair of spaced bars 41 connected at one end, as at 42, and having their other ends fastened to the tray and to the body portion 33 of the cradle or swing 32.

The operating element 40 is actuated from the axle 9 and in the form of the invention shown in Figure 1 this is effected by means of a wheel 43 having rearwardly curved teeth 44 on its periphery. The wheel 43 is spaced from the ground wheel 8 and the bars 41 of the operating element 40 span the wheel 43 so that a roller 44 rotatably mounted on the bars 41 is engaged with the teeth 43. With this arrangement when the machine is pushed forwardly the teeth 43 engage with the roller to cause the operating element 40 and consequently the tray 31 to move back and forth and up and down. The rearward curvature of the teeth 43 facilitate the application of this motion to the member 40 from the wheel 43.

In the form of the invention shown in Figure 3 a depending lug 46 is provided instead of the roller 44 and this lug 46 co-acts with uniformly rounded teeth 47 formed on the wheel 48. Except for the provision of the lug 46 in lieu of the roller and for the different formation of the teeth the arrangement shown in Fig. 3 is exactly the same as that shown in Fig. 1.

The quantity of the material discharged through the opening 30 is regulated by means of a control plate 50 which is slidably fitted in guides 51 secured on the rear end wall 13 of the hopper. The plate 50 is adjusted by means of a hand lever 52 fulcrumed, as at 53, on the hopper and connected with the plate 50 by means of an elongated link 54. The hand lever 52 and consequently the plate 50 is held in adjusted position by means of a vertically adjustable bar 55 which is fitted in a slot 56 provided in the cross member 17. The bar 55 is provided with a series of openings 57 through any one of which a pin 58 may be inserted. The pin 58 engages the cross member 17 to limit the downward movement of the bar 55.

Blocks 60 are nailed or otherwise secured on the handles 10 and engage the hopper to prevent undesirable vibration and make the machine more rigid.

In operation the lever 52 is operated to open the plate 50 to the desired extent and the plate 50 may be held open by adjusting the bar 55 to engage the lever 52 and hold the same in the desired position. Then when the machine is drawn across the ground the tray 31 is moved back and forth and up and down and consequently the fertilizer material is agitated and forcibly discharged through the opening 30 and out through the rear open end of the tray 31. The fertilizer material is covered with soil by the action of the plows 28 and 20. Due to the novel action of the tray 31 a proper distribution and discharge of the fertilizer material is insured even though it be wet and heavy or other adverse conditions are met.

I claim:—

Means for rocking the cradle of a fertilizer distributor from the ground wheel thereof and including an operating element consisting of a pair of spaced bars to be fixed to a tray, an operating wheel fixed to the axis of rotation to the ground wheel and rotated therewith, said operating wheel having curved teeth, said spaced bars spanning said operating wheel, and a roller rotatably mounted on the spaced bars and engageable with the teeth of the operating wheel.

ANDREW J. CHESSON.